United States Patent
Gluch et al.

(10) Patent No.: US 7,075,717 B2
(45) Date of Patent: Jul. 11, 2006

(54) COMPARISON MACROSCOPE HAVING AN ILLUMINATION SYSTEM FOR SPECIMENS

(75) Inventors: Claudia Gluch, Jena (DE); Horst Frimmel, Wetzlar (DE); Christian Woditschka, Wetzlar (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 92 days.

(21) Appl. No.: 10/695,657

(22) Filed: Oct. 28, 2003

(65) Prior Publication Data

US 2004/0136058 A1    Jul. 15, 2004

(30) Foreign Application Priority Data

Oct. 31, 2002    (EP) ................................ 02102520

(51) Int. Cl.
    *G02B 21/06*    (2006.01)
(52) U.S. Cl. ...................... 359/390; 359/385; 359/372; 362/285; 362/430
(58) Field of Classification Search ................ 359/368, 359/391, 385, 390, 372, 373, 374, 375, 376, 359/377, 378, 384; 362/581, 234, 253, 285, 362/289, 287, 382, 418, 419, 430

See application file for complete search history.

(56) References Cited

U.S. PATENT DOCUMENTS

| 2,040,066 | A | * | 5/1936 | Ursinus ..................... 359/373 |
| 3,637,283 | A | * | 1/1972 | Tasaki et al. ............... 359/376 |
| 3,734,593 | A | * | 5/1973 | Mori .......................... 359/376 |
| 4,277,802 | A | | 7/1981 | Yoshida ..................... 358/106 |
| 4,403,839 | A | | 9/1983 | Reichel ...................... 350/514 |
| 6,101,265 | A | * | 8/2000 | Bacus et al. ................ 382/133 |
| 2003/0120282 | A1 | * | 6/2003 | Scouten et al. ............ 606/130 |

FOREIGN PATENT DOCUMENTS

| DE | 30 06 379 C2 | 8/1980 |
| DE | 9413513 U1 * | 10/1994 |

* cited by examiner

Primary Examiner—Arnel C. Lavarias
(74) Attorney, Agent, or Firm—Houston Eliseeva LLP

(57) ABSTRACT

A comparison optical system (1) having an illumination system for specimens, the comparison optical system (1) being equipped with several macroscopes (2a, 2b). The macroscopes (2a, 2b) are connected to one another via a bridge (3). Each macroscope (2a, 2b) is connected to an attachment device (25a, 25b) for the illumination system. The attachment device (25a, 25b) is constructed from several movable arms (30, 32, 35) and an adjustable holder (37) for a light source.

10 Claims, 3 Drawing Sheets

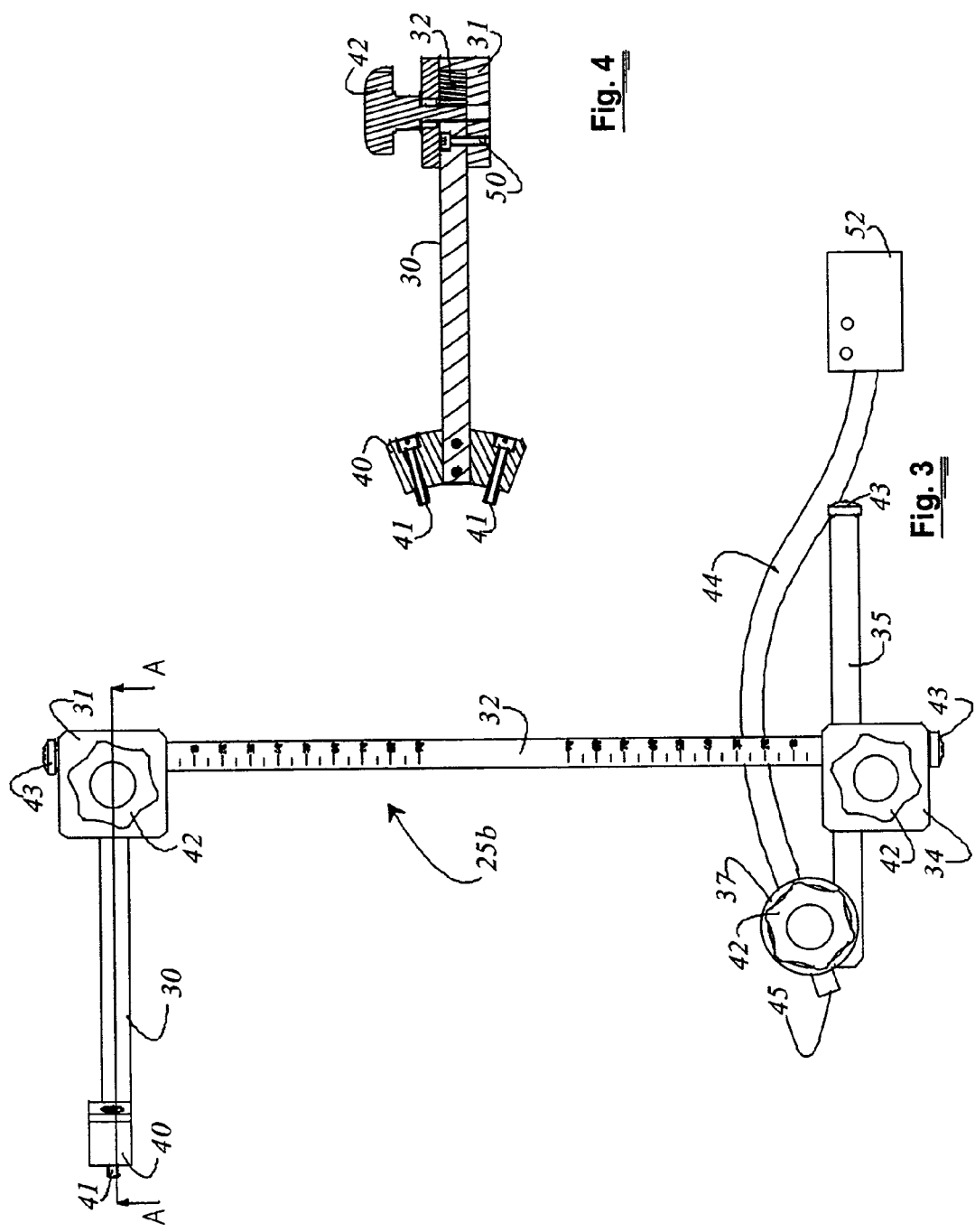

COMPARISON MACROSCOPE HAVING AN ILLUMINATION SYSTEM FOR SPECIMENS

RELATED APPLICATIONS

This application claims priority of the European patent application 02 102 520.0 which is incorporated by reference herein.

FIELD OF THE INVENTION

The invention concerns a comparison macroscope having an illumination system for specimens. The invention concerns, in particular, a comparison optical system having an illumination system for specimens, the comparison optical system being equipped with several macroscopes that are connected to one another via a bridge and thereby coupled mechanically and optically to one another.

BACKGROUND OF THE INVENTION

German Patent DE 30 06 379 discloses a defect inspection system for comparative inspection of a standard specimen and a test item. The test item and the standard specimen are on a common support, and both the standard specimen and the test item are imaged via optical means and combined so that a comparison is possible. A transmitted-light illumination system is provided for illumination of the sample.

U.S. Pat. No. 4,403,839 describes a comparison optical device that is embodied for simultaneous observation of two specimens. A bridge encompasses the optical means for combining the beam paths that are generated by the microscope or macroscope. Illuminating light is introduced into the system by means of the photo tube. The document does not mention how the individual specimens must be arranged on one or more stages.

These macroscopes described above are used in corresponding systems, which are embodied as comparison macroscopes, for performing forensic comparative examinations. In a very well-known embodiment, two individual macroscopes, connected to one another by a bridge, are used. The bridge contains an apparatus for combining the two individual images generated by the individual macroscopes. Through a common tube arranged on the bridge, the operator of the comparison macroscope can view in superimposed fashion the images of specimens arranged on two different stages. Respective blocking of portions of the two samples corresponding to one another yields a composite image which makes possible a direct comparison, for example, of one sample half to the other sample half.

In forensic investigations, crime-solving often requires that an image of a first sample be compared to the image of a second sample in order to obtain more detailed information about the circumstances of a crime.

The specimens compared to one another are, for example, the impressions produced on cartridge cases by the firing pin of a weapon, in order to determine whether the same firearm was used in two or more crimes.

A further known application of optical comparison investigations consists in checking the authenticity of documents, especially banknotes, in order to determine whether they are counterfeit.

Lastly, crime-solving often requires comparing, for example, clothing fibers found at the crime scene to fibers of known articles of clothing, in order to obtain information about how a perpetrator was dressed at the time of a crime.

SUMMARY OF THE INVENTION

It is the object of the invention to create a comparison optical system which allows a user to establish reproducible conditions. The object of the invention is, in particular, to achieve reproducible illumination conditions for a specimen.

This object is achieved by way of a comparative optical system comprising:
 two macroscopes,
 a bridge which couples the macroscopes mechanically and optically to one another,
 an XYZ stage associated to each macroscope for placing a sample thereon,
 an illumination system for specimens placed on the XYZ stage, and
 an attachment device for the illumination system is connected to each macroscope, wherein each attachment device has several movable arms and an adjustable holder for a light source.

The invention has the advantage that the user of the comparison optical system can reproducibly examine specimens that were already examined some time ago. The comparison optical system comprises several macroscopes that are connected to one another via a bridge. The macroscopes are thereby mechanically and optically coupled to one another. Each macroscope is connected to an attachment device for an illumination system, the attachment device comprising several movable arms and an adjustable holder for a light source. Each macroscope is equipped with a rotatable ring to which a first arm is attached. The rotatable ring is equipped with a scale and can be immobilized using a locking screw. Provided at the end of the first arm opposite the rotatable ring is a first clamping apparatus on which a second arm, equipped with a scale, is guided. Provided on the second arm, opposite the first clamping apparatus, is a second clamping apparatus in which the second arm and a third arm are guidable perpendicular to one another, and that a holder for an illumination system is mounted opposite the second clamping apparatus. It is particularly advantageous if the illumination system or light source is embodied as a light guide. The light exit surface of the light guide is clamped in the holder, and directed onto the particular specimens to be examined.

Further advantageous embodiments of the invention are evident from the dependent claims.

BRIEF DESCRIPTION OF THE DRAWINGS

The subject matter of the invention is depicted schematically in the drawings and will be described below with reference to the Figures, in which:

FIG. 3 is a detail view of an adjustable attachment apparatus having a holder for a light source; and FIG. 4 is a detail view of the attachment device of FIG. 3 along line A—A.

DETAILED DESCRIPTION OF THE INVENTION

Figure 1:
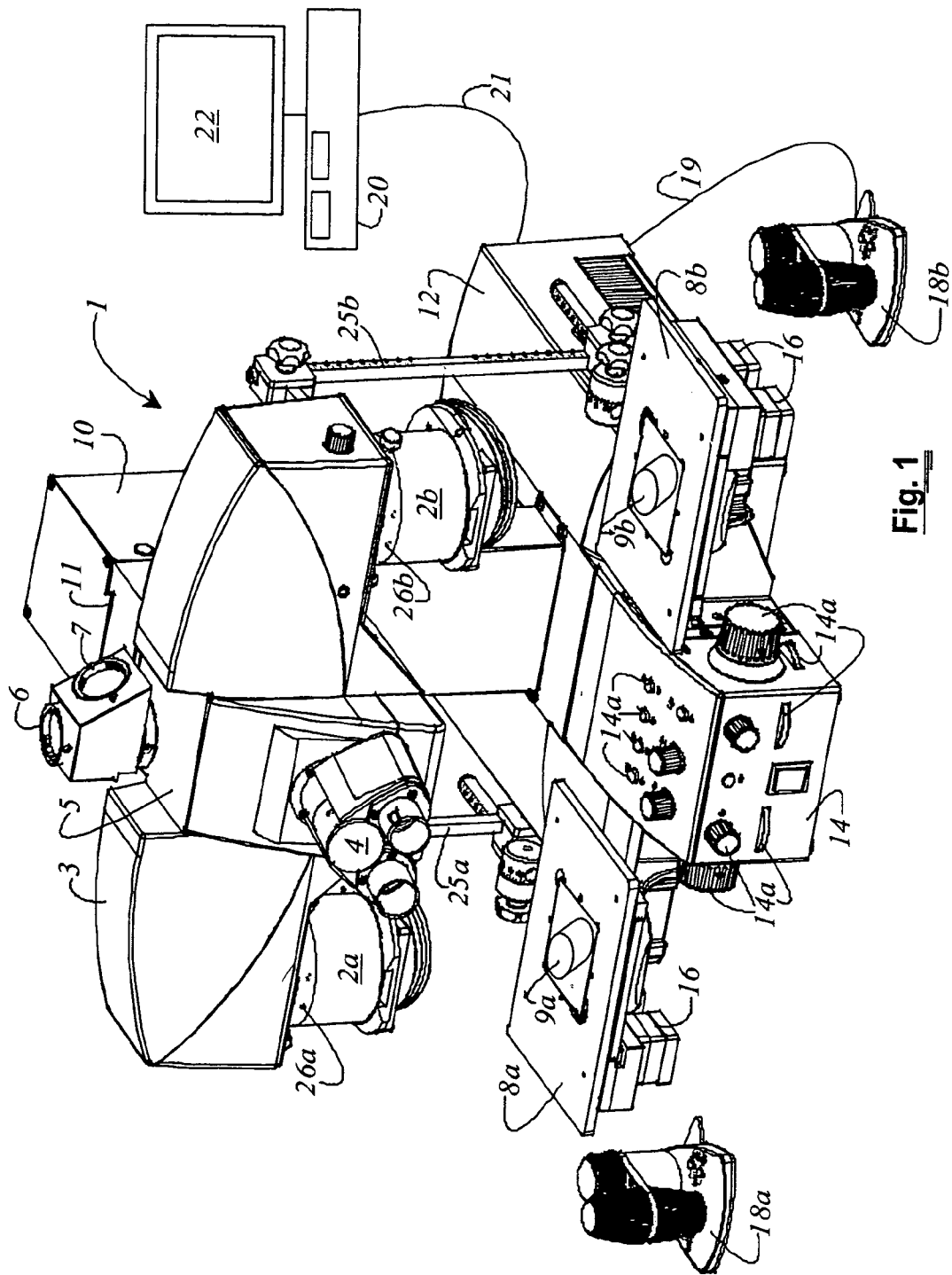
FIG. 1 is a perspective view of an embodiment of a comparison macroscope having a device for attaching an illumination system for a specimen.

FIG. 1 shows a comparison optical system 1. In this embodiment, comparison optical system 1 comprises a first and a second macroscope 2a and 2b that are configured as image-acquiring optical subsystems. First and second macroscope 2a and 2b are mechanically and optically connected to one another via a bridge 3. Bridge 3 possesses a viewing port 4 for a user, and a tube 5 having a connection 6 for a camera (not depicted). Viewing port 4 for the user can be configured pivotably in order to maintain an ergonomic working position for the user. Tube 5 can additionally possess a further connection 7 with which, for example, a second camera (not depicted) can be attached. A first XYZ stage 8a is associated with first macroscope 2a. A second XYZ stage 8b is associated with second macroscope 2b. A specimen to be compared 9a and 9b is placed respectively on first and on second XYZ stage 8a and 8b. In comparison macroscopy, both bullets and tools are assessed as specimens, and the traces left thereby are optically compared to one another and evaluated. This is done, in most cases, by splitting the image in the middle so that specimen 9a positioned on first XYZ stage 8a is visible in the left half, and the specimen 9b positioned on second XYZ stage 8b is visible in the right half.

Bridge 3, together with first and second XYZ stage 8a and 8b, is mounted on a column 10 via a dovetail guide 11. By way of dovetail guide 11, bridge 3 attaches. Column 10 is displaceable in the Z direction, or vertically, relative to the surface of XYZ stages 8a and 8b. The movement of bridge 3 allows coarse focusing of the specimens, present on the two stages 8a and 8b, whose structures are to be compared. Column 10 itself is joined to a base 12 which is substantially wider than column 10 in order to achieve sufficient stability and steadiness for comparison optical system 1. Arranged between the first and on the second XYZ stage 8a and 8b is a control and adjustment apparatus 14 with which various functions of comparison optical system 1 can be adjusted or modified. Control and adjustment apparatus 14 possesses several actuation elements 14a with which various functions of comparison optical system 1 can be actuated. It is self-evident that control and adjustment apparatus 14 depicted in FIG. 1 can be variously embodied.

The two XYZ stages 8a and 8b are displaceable in the X direction, Y direction, and Z direction by way of several motors 16. A first and a second remote control device 18a and 18b can moreover also be associated with comparison optical system 1. In this embodiment, the first and a second remote control device 18a and 18b are each connected to comparison optical system 1 via a cable 19. It is self-evident that the connection can assume any technical configuration, for example radio, infrared, etc. Comparison optical system 1 can additionally have associated with it a PC 20 that, via an RS232 cable or USB cable 21, supplies control signals to comparison optical system 1 and receives image data or settings data from comparison optical system 1. The image data are displayed to the user on a monitor 22 that is connected to PC 20. The current settings data of comparison optical system 1 can also be displayed to the user on monitor 22. Each macroscope 2a and 2b is moreover connected to an attachment device 25a and 25b for specimen illumination (see FIG. 3).

Figure 2:
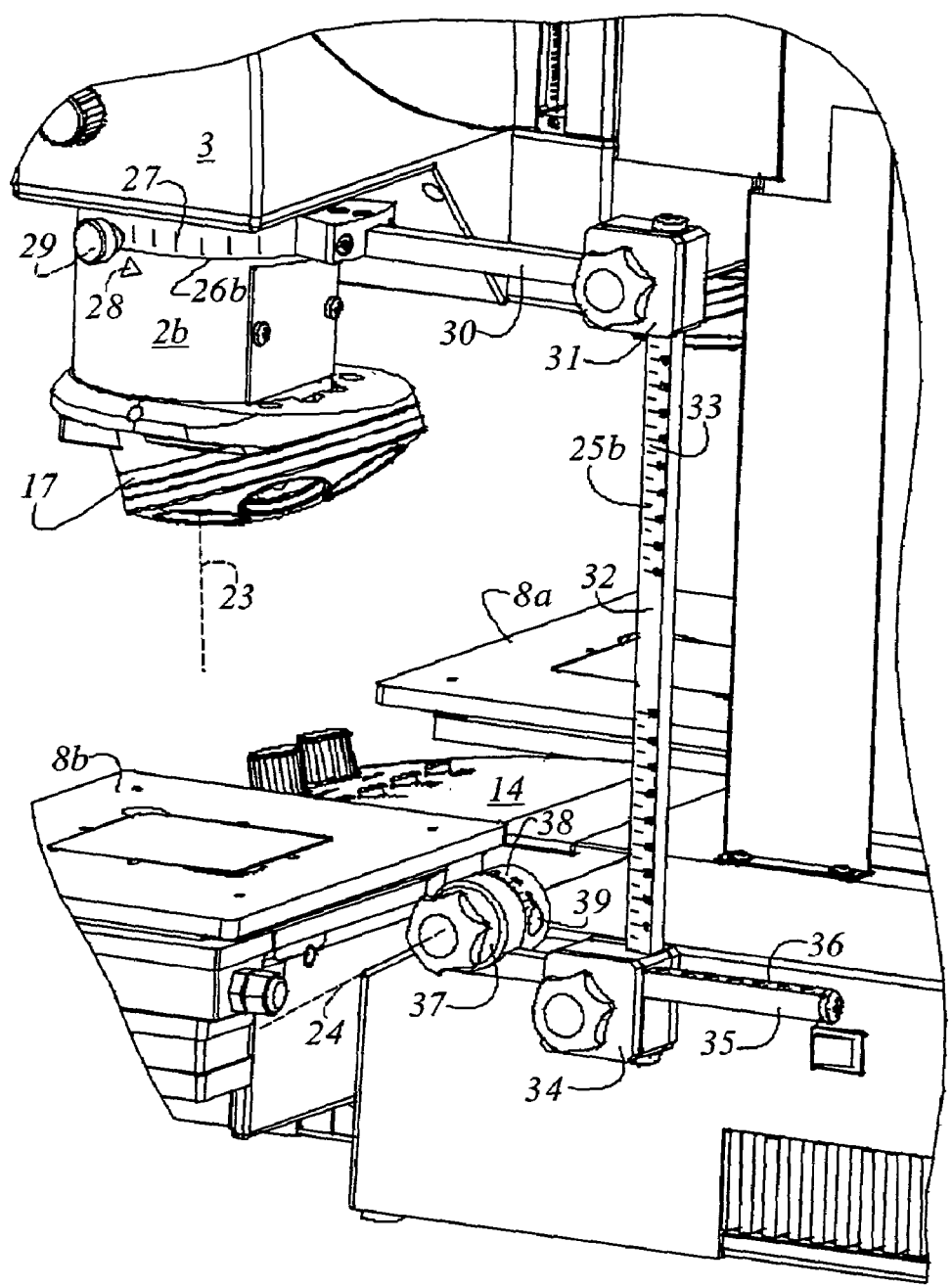
FIG. 2 is a perspective detail view of the device for attaching an illumination system, and of the installation of the device on the macroscope.

FIG. 2 is a perspective detail view of attachment device 25b that is associated with second macroscope 2b. Attachment device 25b serves to hold an illumination system for the respective specimen 9a or 9b present on XYZ stage 8a or 8b. Elements that correspond to the elements of FIG. 1 are labeled with the same reference characters. Attachment device 25b is attached to macroscope 2b on a rotatable ring 26b that is equipped with a scale 27. Rotatable ring 26a or 26b is rotatable about an axis 23. Attachment device 25b encompasses a first arm 30 that is bolted onto rotatable ring 26b. Associated with scale 27 is a read-off mark 28 that is used to read off the scale on rotatable ring 26a, 26b. Rotatable ring 26a, 26b can be immobilized by means of a locking screw 29. Provided on an end of first arm 30 located opposite rotatable ring 26a, 26b is a first clamping apparatus 31 in which a second arm 32, also equipped with a scale 33, is guided. Provided on second arm 32 opposite first clamping apparatus 31 is a second clamping apparatus 34 in which second arm 32 and a third arm 35 are guidable perpendicular to one another. Third arm 35 is also equipped with a scale 36. A holder 37, which has a scale 38 on the periphery, is mounted on third arm 35 opposite second clamping apparatus 34. Holder 37 is rotatable about an axis 24. Holder 37 moreover possesses an opening 39 in which the illumination system for the specimen can be attached. Additionally mounted on macroscope 2b is a nosepiece 17 with which various objectives (not depicted) can be brought into the beam path of macroscope 2b.

FIG. 3 is a detail view of attachment device 25b. First arm 30 carries first clamping apparatus 31; and on first arm 30 opposite first clamping apparatus 31, a shoe 40 is connected to first arm 30. With shoe 40, first arm 30 can be attached to rotatable ring 26b of second macroscope 2b. On first macroscope 2a, an attachment device 25a is of course attached to rotatable ring 26a. Attachment of shoe 40 to rotatable ring 26b is accomplished via at least one screw 41. First clamping apparatus 31 possesses a thumbscrew 42 which clamps second arm 32 that is guided in first clamping apparatus 31. Second clamping apparatus 34, in which second arm 32 is also guided, is provided opposite first clamping apparatus 31. The ends of second arm 32 are each equipped with a screw 43 whose head has a greater diameter than second arm 32, in order thereby to prevent second arm 32 from sliding out of first clamping apparatus 31 and second clamping apparatus 34. Third arm 35, which carries holder 37 opposite second clamping apparatus 34, is guided in second clamping apparatus 34 perpendicular to second arm 32. A light guide 44, which transports illuminating light from a light source 52 to the specimen, is secured in holder 37. Light exit end 45 of light guide 44 is secured in the holder. Holder 37 is rotatable so that illuminating light can be optimally directed onto the specimen. Light source 52 is also connected to PC 20, and receives therefrom corresponding control signals for adjusting the intensity.

FIG. 4 is a sectioned depiction of attachment device 25a or 25b along the section line depicted in FIG. 3 and labeled A—A. First clamping apparatus 31 is attached to first arm 30 with a screw 50. Shoe 40 is permanently attached to first arm 30 opposite first clamping apparatus 31. Shoe 40 possesses the curvature of rotatable ring 26a, and is attached thereon using two screws 41. Second arm 32 is guided in first clamping apparatus 31 and can be clamped with thumbscrew 42.

Rotatable ring 26a and 26b possesses a scale 27, second arm 32 possesses a scale 33, third arm 35 possesses a scale 36, and holder 37 also possesses a scale 38. When specimens are examined, the illumination is adjusted, using attachment device 25a and 25b, in such a way that the illumination conditions which are established ensure optimum detection of the features to be examined. A read-off mark (not depicted) can likewise be provided respectively on clamping apparatus 31, clamping apparatus 34, and holder 37 in order to inform the user as to the read-off point for the respective scales. The values for optimum illumination situations can be read off from the various scales 27, 33, 36, 38. The values are recorded, for example in order to obtain the same illumination conditions for later examinations. These values can be recorded and stored in a table in PC 20, for example together with the image file and the electrically detectable macroscope settings, e.g. position of the semi-apertures, objective magnification, lamp intensity, etc.,. When specimens 9a and 9b are once again comparatively examined, the file in PC 20 pertaining to the specimens can be retrieved. The values are set on attachment device 25a and 25b so that the same illumination conditions can be reproduced. By analogy with the values that are read off from scales 27, 33, 36, 38 and stored in the file in PC 20, further settings data, for example the position of XYZ stages 8a, 8b, the objective used, illumination intensity, etc. can automatically be saved in the file when the image is acquired. When another examination is made, these values can then be automatically traveled to or set. A prerequisite for this is appropriate motorization of macroscopes 2a, 2b.

The invention claimed is:

1. A comparison optical system comprising:
   two macroscopes,
   a bridge which couples the macroscopes mechanically and optically to one another,
   an XYZ stage associated with each macroscope for placing a sample thereon,
   an illumination system for specimens placed on the XYZ stage,
   an attachment device for the illumination system is connected to each macroscope, wherein each attachment device has a plurality of movable arms and an adjustable holder for a light source, wherein at least one scale is disposed on each movable arms; and
   a personal computer associated with the comparison optical system for storing optimal illumination conditions established for examination, the optimal illumination conditions determined based on the values of at least one scale and stored in a file together with image data of the specimens to be compared, wherein the stored values of at least one scale are retrieved together with the image data.

2. The comparison optical system as defined in claim 1, wherein each macroscope encompasses a rotatable ring to which a first arm of the plurality of movable arms is attached.

3. The comparison optical system as defined in claim 2, wherein the rotatable ring is equipped with a scale and a locking screw immobilizing the rotatable ring.

4. The comparison optical system as defined in claim 2, wherein the first arm has an end opposite the rotatable ring, and a first clamping apparatus guiding a second arm equipped with a scale.

5. The comparison optical system as defined in claim 4, wherein a second clamping apparatus is disposed on the second arm opposite the first clamping apparatus, in which the second arm and a third arm are guidable perpendicular to one another; and a holder for an illumination system is mounted opposite the second clamping apparatus.

6. The comparison optical system as defined in claim 5, wherein the holder is rotatable about an axis perpendicular to a rotation axis of the rotatable ring and perpendicular to the third arm.

7. The comparison optical system as defined in claim 6, wherein the holder is equipped with a scale.

8. The comparison optical system as defined in claim 1, wherein the exit end of a light guide serves as the light source, the light incidence onto the specimens being determined by the values of at least one scale on the attachment element.

9. The comparison optical system as defined in claim 8, wherein the light Source is connected to a personal computer and receives control signals therefrom.

10. The comparison optical system as defined in claim 1, wherein the positions of the XYZ stages, the intensity of the light source, and the position of a revolving nosepiece are stored in a file provided in a personal computer, and wherein those values we retrieved from the file in order to adjust one or two macroscopes.

* * * * *